United States Patent [19]

Ford et al.

[11] Patent Number: 5,320,747

[45] Date of Patent: Jun. 14, 1994

[54] APPARATUS FOR REMOVING SOLID MATTER FROM FLUID SYSTEMS

[75] Inventors: Steven D. Ford, Clovis, Calif.; W. Lee Haslup, Dunwoody, Ga.

[73] Assignee: Claude Laval Corp., Fresno, Calif.

[21] Appl. No.: 993,568

[22] Filed: Dec. 21, 1992

[51] Int. Cl.5 .................. B01D 21/24; B01D 33/00
[52] U.S. Cl. .................. 210/94; 210/140; 210/142; 210/147; 210/360.1
[58] Field of Search .................. 210/94, 95, 138, 140, 210/141, 142, 143, 147, 360.1, 512.1, 110, 134, 137, 782, 787

[56] References Cited

U.S. PATENT DOCUMENTS

| 3,523,889 | 8/1970 | Eis . | |
|---|---|---|---|
| 3,794,169 | 2/1974 | Sisk et al. | 210/140 |
| 4,517,099 | 5/1985 | Brackner | 210/104 |
| 4,661,253 | 4/1987 | Williams | 210/411 |
| 4,762,620 | 8/1988 | Sama | 210/94 |
| 4,867,877 | 9/1989 | Hansen et al. | 210/257.1 |
| 4,915,844 | 4/1990 | Imamura et al. | 210/651 |
| 4,940,549 | 7/1990 | Olsen et al. | 210/695 |
| 5,007,251 | 4/1991 | Takeishi et al. | 210/618 |
| 5,024,762 | 6/1991 | Ford et al. | 210/321.69 |
| 5,045,115 | 9/1991 | Gmunder et al. | 106/709 |

Primary Examiner—Robert A. Dawson
Assistant Examiner—David Reifsnyder
Attorney, Agent, or Firm—Henderson & Sturm

[57] ABSTRACT

A method and apparatus for removing solid matter from fluid systems which does not require system shutdown and minimizes the loss of system fluids. The invention first isolates the solid matter collection reservoir from the fluid system and then purges the reservoir for external disposal or recovery of the solid matter. The purging sequence is enhanced through the use of a venting system which prevents pressure differential buildup and also prevents the introduction of air into the separation device during the purging sequence. The entire process can be controlled manually or automatically through a control system.

10 Claims, 2 Drawing Sheets

APPARATUS FOR REMOVING SOLID MATTER FROM FLUID SYSTEMS

TECHNICAL FIELD

This invention relates to a method and apparatus for removing solid matter from fluid systems, and more particularly to a method and apparatus for purging solid matter which has accumulated within a solid matter separation system.

BACKGROUND ART

Systems for the protection of mechanical components of fluid systems such as spray nozzles, pumps, piping and valves are well known in the art. Such systems typically consist of screen and filter elements or centrifugal separation systems, both of which require the removal of the solid matter once it has been filtered or separated from the liquid carrier. Screens and filter elements are very troublesome in that they require frequent cleaning or replacement, often produce high and/or fluctuating pressure losses, and are excessively large. These systems are normally backwashed for cleaning and therefore require system shutdown and the loss of large quantities of system fluid. Separators alleviate many of these problems, but still result in some system fluid loss during purging.

DISCLOSURE OF THE INVENTION

The present invention describes a novel method and apparatus for the purging of solid matter which has accumulated within a solid matter separation system. The invention allows continuous operation of the fluid system, nearly eliminates fluid loss from the system, and requires only limited space. This is accomplished by isolating the solid matter collection reservoir from the system during the brief purging process. The reservoir is vented to prevent the buildup of pressure differentials during the purging sequence and also to prevent the introduction of air into the separation device.

BRIEF DESCRIPTION OF THE DRAWINGS

These and other attributes of the invention will become more clear upon a thorough study of the following description of the best mode for carrying out the invention, particularly when reviewed in conjunction with the drawings wherein.

BEST MODE FOR CARRYING OUT THE INVENTION

Figure 1:
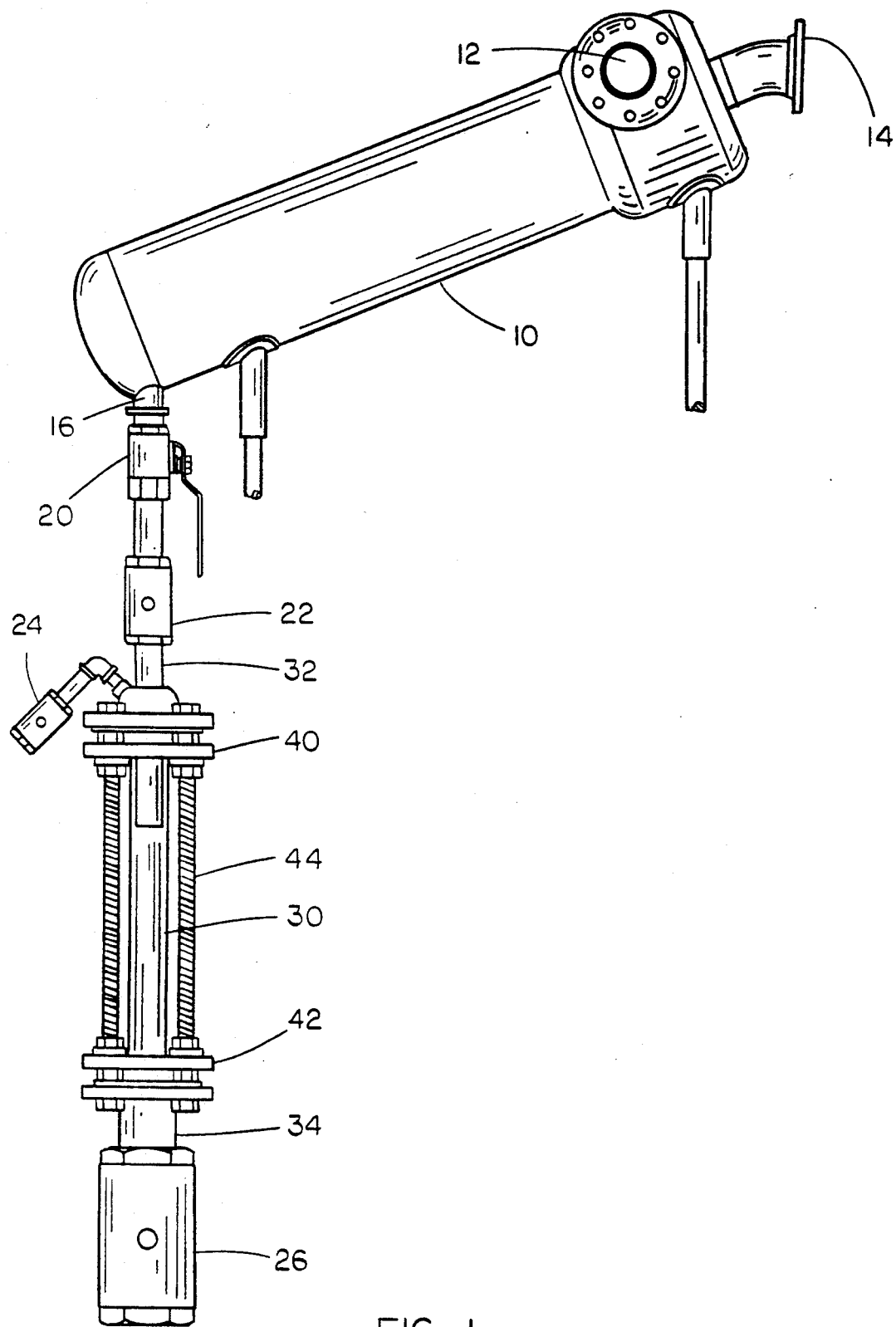
FIG. 1 is a perspective view of one embodiment of the invention.

Referring now to the drawings, in FIG. 1 is shown a preferred embodiment of the present invention utilizing a solid matter centrifugal separator 10, well known in the art. Fluid from the system from which solid matter is to be removed enters the separator 10 at inlet port 12, and uncontaminated fluid exits the separator at outlet port 14. Solid matter which has been removed from the fluid passes from the separator via line 16, and, after passing through manual valve 20 and reservoir inlet valve 22, enters the reservoir 30 through reservoir inlet line 32. Manual valve 20 and reservoir inlet valve 22 are normally in the open positions to allow solid matter to pass into the reservoir 30. Manual valve 20 would ordinarily be used to isolate the reservoir from the fluid system for maintenance. Reservoir inlet valve 22 operates during the reservoir purging sequence to be described below. In a preferred embodiment of the present invention, the reservoir 30 is fabricated from a transparent material which will allow visual inspection to determine if purging is required. As seen in FIG. 1, the reservoir 30 may be an elongate, transparent cylinder. This cylinder is sealed at its ends by gasket assemblies 40 and 42, which are held in a relatively fixed position by a four elongate bolts 44. The gasket assemblies 40 and 42 are secured to reservoir inlet line 32 and reservoir outlet line 34. Also shown in FIG. 1 is pressure relief valve 24, connected to gasket assembly 40, which is vented to the atmosphere and operates to equalize pressure changes within the reservoir and to prevent the introduction of air into the separation system when the reservoir is reconnected to the separation system at the end of the purging sequence. Reservoir outlet valve 26 provides for discharge of the solid matter from the reservoir 30.

Figure 2:
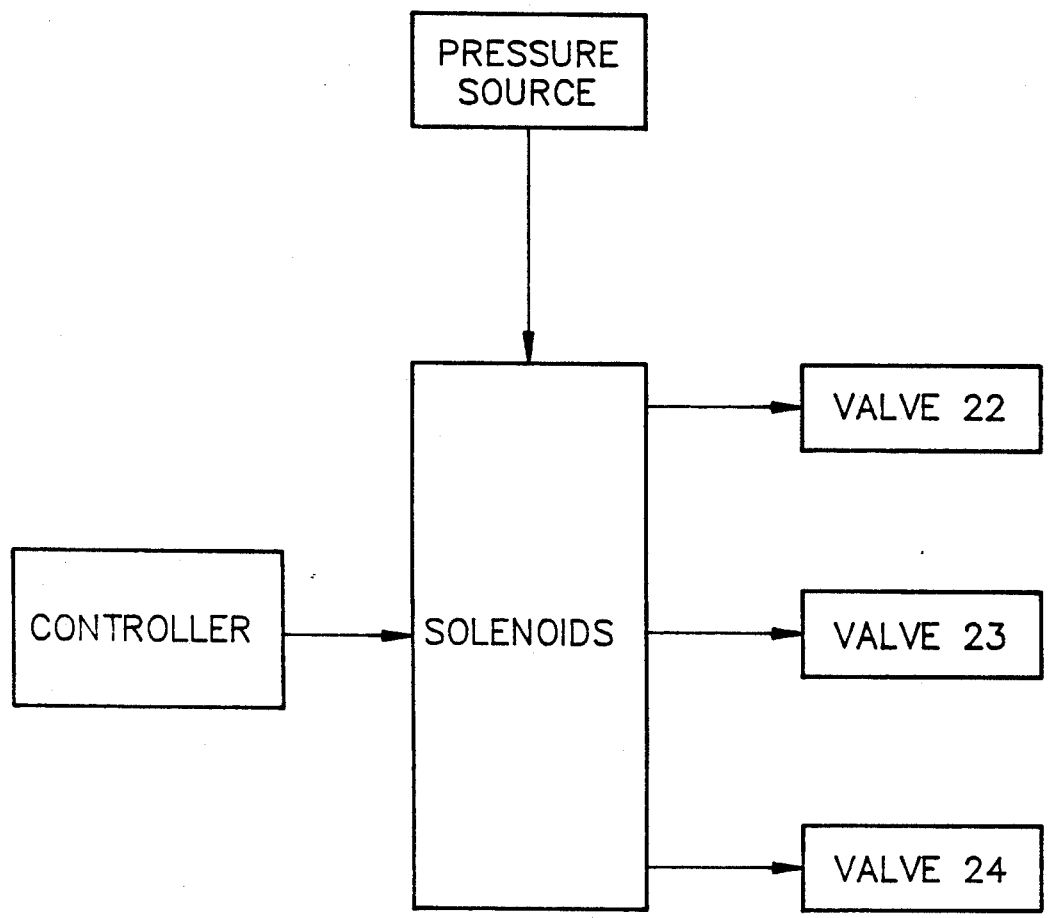
FIG. 2 is a diagrammatic presentation of the control mechanism of the present invention.

FIG. 2 is a diagram of a control system for the present invention, in which a controller 60 sends operating signals to a solenoid assembly 62. The controller may be programmed to automatically purge at such times as desired, and may also control the duration of the various purge sequential operations. The controller 60 may also be manually actuated if a purging out of the ordinary programmed timing cycle is desired. A preferred embodiment of the invention will use pneumatic pressure from a compressed air supply 64 which is controlled by the solenoid assembly 62 to direct pressure to valves 22, 24, and 26 for control of the purging process. In this preferred embodiment, valves 22, 24, and 26 are pneumatic pinch valves. Of course, it would be obvious to one skilled in the art to substitute a hydraulic system for the pneumatic embodiment, or to use electrical control valves in the purging cycle.

Typical operation of the present invention would be as follows. In the normal configuration, manual valve 20 and inlet valve 22 are open, while relief valve 24 and outlet valve 26 are closed. When a purging of the reservoir 30 is necessary, either as determined visually or as preset into the controller 40, signals are sent to the solenoid assembly 62 to begin the purging sequence. First, inlet valve 22 closes to isolate the reservoir during the purge cycle. Next, relief valve 24 and outlet valve 26 open simultaneously so that collected solid matter may be discharged. The relief valve is necessary to prevent the buildup of a pressure differential within the reservoir which would hinder the solid matter from discharging. After a programmed time period of appropriate duration (typically eight seconds), outlet valve 26 will close and inlet valve 22 will open to allow the reservoir to be refilled from the fluid system. Relief valve 24 remains in the open position to allow discharge of air from the reservoir as it fills with fluid. Finally, after a programmed delay period of appropriate duration (typically two seconds), relief valve 24 will close and the system will return to normal operating condition.

Obviously, many modifications and variations of the present invention are possible in light of the above teachings. For example, it would be obvious to one skilled in the art to use a reservoir of many different shapes and sizes or of many different materials. Further, the separator described in the preferred embodiment may be replaced by other types of filtration systems that require periodic purging. Control of the system may be purely manual, or purely automatic. Control sequencing and timing may vary in any number of respects. As recited above, the control system may utilize hydraulic, pneumatic, or electric valves of any number of types well known in the art. It is therefore to be understood that, within the scope of the appended claims, the invention may be practiced otherwise than as specifically described.

We claim:

1. An apparatus for removing solid matter from fluid systems, comprising:
   (a) a centrifugal separator;
   (b) a reservoir having an inlet, an outlet, and a pressure relief port;
   (c) an inlet valve operably connected between said centrifugal separator and said reservoir inlet;
   (d) an outlet valve operably connected to said reservoir outlet;
   (e) a relief valve operably connected to said reservoir pressure relief port; and
   (f) a control system connected to said inlet valve and said outlet valve and said relief valve for operably controlling said valves.

2. The apparatus as recited in claim 1 wherein said reservoir has means for visually determining the extent to which it is filled with solid matter.

3. The apparatus as recited in claim 1 wherein said control system may be operated manually and automatically.

4. The apparatus as recited in claim 1 wherein said inlet valve and said outlet valve and said relief valve are pneumatically operated and electrically controlled.

5. The apparatus as recited in claim 1 wherein said inlet valve and said outlet valve and said relief valve are hydraulically operated and electrically controlled.

6. The apparatus as recited in claim 1 wherein said inlet valve and said outlet valve and said relief valve are electrically operated and electrically controlled.

7. The apparatus as recited in claim 1 wherein said inlet valve and said outlet valve and said relief valve are pinch valves.

8. The apparatus as recited in claim 1, further comprising a second inlet valve which is manually operated.

9. The apparatus as recited in claim 1 wherein said control system comprises a timer assembly, electric solenoids, and hydraulic pressure means.

10. The apparatus as recited in claim 1 wherein said control system comprises a timer assembly, electric solenoids, and pneumatic pressure means.

* * * * *